United States Patent [19]

Schmitt

[11] 3,861,032

[45] Jan. 21, 1975

[54] METHOD OF MANUFACTURING AND TESTING THERMAL FUSES

[75] Inventor: Donald J. Schmitt, Mansfield, Ohio

[73] Assignee: Therm-O-Disc Incorporated, Mansfield, Ohio

[22] Filed: Oct. 24, 1971

[21] Appl. No.: 409,254

[52] U.S. Cl. ........................ 29/623, 29/407, 29/593, 337/348, 337/367

[51] Int. Cl. ............................................ H01h 69/02

[58] Field of Search ...... 29/623, 407, 593; 337/365, 337/367, 91, 348, 343

[56] References Cited

UNITED STATES PATENTS

| | | | |
|---|---|---|---|
| 3,230,607 | 1/1966 | Gelzer | 29/593 |
| 3,530,419 | 9/1970 | Hire | 337/354 X |
| 3,555,479 | 1/1971 | Polkinghorn | 337/367 X |
| 3,715,699 | 2/1973 | Hire | 337/367 X |

FOREIGN PATENTS OR APPLICATIONS

| | | | |
|---|---|---|---|
| 676,657 | 7/1952 | Great Britain | 337/367 |

*Primary Examiner*—C. W. Lanham
*Assistant Examiner*—Victor A. DiPalma
*Attorney, Agent, or Firm*—McNenny, Farrington, Pearne & Gordon

[57] ABSTRACT

A method of testing and subsequently resetting a bimetal snap disc operated thermal fuse is disclosed. In one embodiment, the thermal fuse is provided with access permitting the insertion of a resetting tool to press the disc to its reset portion. The access opening is closed subsequent to the resetting operation. In another embodiment, a differential pressure is applied across the disc for resetting purposes. In another embodiment, a magnet is used to reset the disc. In another embodiment, the disc is subjected to a reset temperature which is normally not encountered in the field. In the last illustrated embodiment, the disc is reset by subjecting it to acceleration of sufficient magnitude to produce an inertia force for resetting the disc.

16 Claims, 5 Drawing Figures

PATENTED JAN 21 1975

3,861,032

METHOD OF MANUFACTURING AND TESTING THERMAL FUSES

BACKGROUND OF THE INVENTION

This invention related generally to temperature responsive fuse devices or the like and more particularly to a novel and improved method and apparatus for manufacturing and testing bimetal snap discs operated thermal fuse devices or the like.

PRIOR ART

Devices employing bimetal snap discs are well known. In many such devices, a switch is operated by the snap disc when the disc reaches a predetermined disc operating temperature. When the device is intended to function as a fuse, it is often constructed so that the disc will remain in the operated position and will not automatically return to its initial or reset position. Devices of such type are disclosed in the application for U.S. Pat., Ser. No. 378,256, filed Jul. 11, 1973. In other instances, the device employs a switch-like arrangement which opens on operation of the disc and will not close even if the disc returns to its initial condition. The U.S. Pat. No. 3,715,697 discloses an example of such latter device.

In both types of devices, it is impossible to operate the device to test for proper operation since the device, once operated, cannot be reset to its initial condition.

SUMMARY OF THE INVENTION

In accordance with the present invention, a method and apparatus is provided for resetting bimetal snap disc thermal fuse devices or the like after they have been operated to test for proper function. The method employed for resetting the snap disc is not available to the user. Consequently, the fuse cannot be reset in the field even though it can be tested and subsequently reset during manufacture. In accordance with the broadest aspects of this invention, the resetting can be accomplished by either mechanical or thermal forces. For example, if the snap disc is of the type which is calibrated to provide a reset temperature below any temperature expected to be encountered in the environment in which the device will be used, one illustrated method of resetting the device would include subjecting the device to extreme cold temperatures substantially below the temperatures expected to be encountered and sufficiently low to cause the snap disc to reset.

In accordance with other aspects of the present invention, forces are applied to the snap disc in the manner not available to the user in order to mechanically cause the snap disc to reset.

In each embodiment illustrated, the thermal fuse is provided with a bimetal snap disc which, upon operation, opens the switch. The snap disc is selected so that it will not automatically reset and will maintain the switch in the open condition until the device is replaced. Resetting of the device, however, can be achieved during manufacture to permit the testing for proper operation of the device.

DETAILED DESCRIPTION OF THE DRAWINGS

Figure 1:
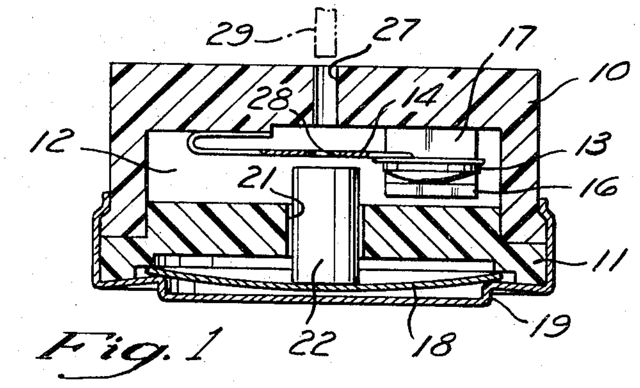
FIG. 1 is a side elevation in longitudinal section of a simple bimetal snap disc operated thermal fuse arranged to permit the insertion of a special tool for resetting the disc after it has been test operated.

In the various embodiments of this invention illustrated in the drawings, a representative type of thermal fuse is illustrated. It should be understood, however, that the particular thermal fuse structure illustrated can be varied widely so long as the structure is compatible with the broader aspects of this invention.

Figure 3:
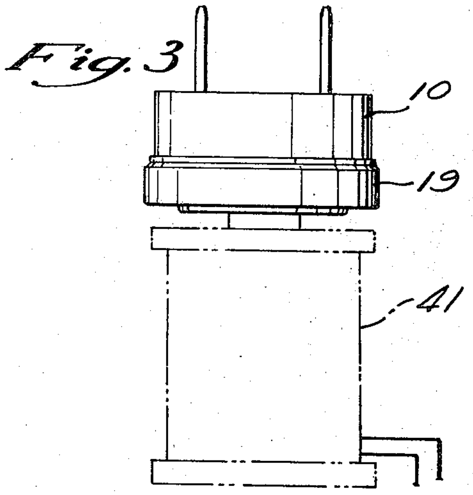
FIG. 3 illustrates a method of resetting the thermal fuse in which an electromagnet is used to exert a resetting force on the disc.
Figure 4:
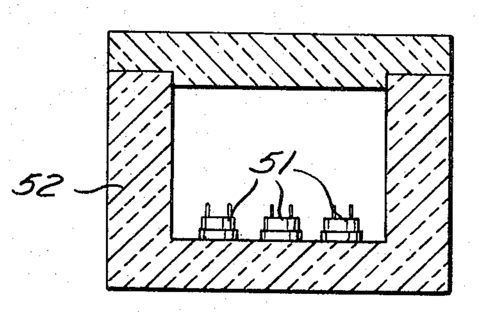
FIG. 4 is a schematic illustration of a thermal method of resetting a thermal fuse in which the device is subjected to extreme low temperatures substantially below the temperature normally encountered.

In each of the embodiments illustrated, the thermal fuse includes a body assembly consisting of a generally cup-shaped body element 10 and a closure element 11, both of which are normally molded from a phenolic type resin or the like. The two body elements 10 and 11 cooperate to define a switch chamber 12. Positioned in the switch chamber 12 is a mobile contact 13 supported on the free end of a cantilever-mounted resilient contact support 14. A stationary contact 16 is provided by the end of a fixed contact support 17. The two contact supports 14 and 17 are normally mounted on the body element 10 by a rivet (not illustrated) and are normally connected to external terminals, as illustrated in FIGS. 3 and 4. The mobile contact support 14 is shaped to maintain the two contacts 13 and 16 closed excepting when they are separated to open the switch by the action of a bimetal snap disc 18.

The bimetal snap disc 18 is formed with a shallow dish shape, and is calibrated so that it snaps from one position of stability illustrated to its opposite position of stability upon reaching a perdetermined calibration temperature. The disc 18 is supported at its periphery by a disc retaining cup 19. In the illustrated embodiment, the retainer cup 19 also functions to hold the two body elements 10 and 11 together. Located in a guide opening 21 formed in the body element 11 is an elongated bumper 22 which functions to operate the switch in response to snap action of the disc 18. Clearance or lost motion is provided to insure that the disc is in full snap movement before the bumper causes the switch operation.

The thermal device illustrated is not automatic in that the disc 18, once it snaps through from the reset position illustrated in FIG. 1 to its opposite position of stability, will not automatically snap back to the illustrated reset position when exposed to any of the temperatures normally encountered by the device in its installed or operating condition. This nonautomatic operation of the disc can be achieved in one of two ways. First, the disc can be calibrated with a reset temperature at which it will snap back to the reset position which is substantially below or above any temperature encountered by the installed device. Conversely, the disc can be formed of a material which is incapable of producing sufficient reverse stresses to cause resetting. Reference may be made to the copending application, Ser. No. 378,256, filed Jul. 11, 1973, for a full disclosure of such discs. Either type of disc can be used in any of the embodiments illustrated, excepting for the embodiment of FIG. 4 which requires that the disc be of the type having a reset temperature below or above the normal temperature to which the device is subjected.

Referring now to the embodiment of FIG. 1, the body element 10 is formed with a centrally located opening 27 extending through its upper wall. Aligned with the opening 27 is a similar opening 28 formed in the support arm 14. The openings 27 and 28 provide access for a reset tool 29 which, in the illustrated embodiment is a simple rod tool, and permits the tool to be inserted into the device until it engages the adjacent end of the bumper 22. A force is applied by the tool 29 to the bumper 22 which in turn mechanically applies a force to the disc 18, causing it to snap back to its reset position as illustrated. It should be recognized that the temperature of the disc must be allowed to return to a non-operating temperature so that the disc, once it is reset, will not again operate.

In the normal testing, the device is assembled as illustrated with the disc in its unoperated or reset position. The device is then subjected to operating temperatures at which the disc is caused by the thermally induced forces therein to snap through to its operated position. This causes the bumper 22 to be moved toward the mobile contact 14 causing the switch to open. The operation of the disc is preferably determined by connecting the terminals of the switch to a sensing circuit which determines the instant the switch opens. In this manner, it is possible to determine whether or not the disc operates within the required limits. If the device malfunctions in that the disc does not operate within the required limits, the device is rejected. On the other hand, if it operates properly as determined by sensing the operation of the switch, the device is allowed to return to the temperature at which it can be reset, and the tool 29 is used to reset the disc. Here again, the resetting of the disc is most conveniently determined by connecting the terminals of the switch to a test circuit which indicates whether or not the contacts have reclosed and remain in the closed condition when the tool 29 is removed. After the tool 29 is removed, the opening 27 is preferably permanently closed with a settable adhesive such as an epoxy resin. The permanent closure of the opening 27 serves two functions. First, it tends to prevent contamination of the switch by foreign matter, and also, it prevents the user from resetting the disc after operation thereof.

Figure 2:
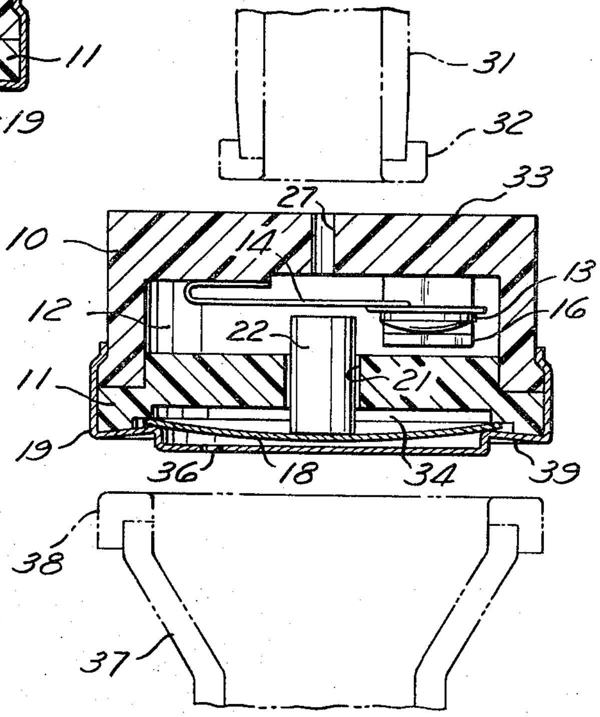
FIG. 2 is a side elevation in longitudinal section illustrating a similar type of thermal fuse adapted to be reset by the use of pneumatic pressure or vacuum.

In the embodiment of FIG. 2, a differential pressure is applied across the disc to reset the disc after it has been operated for test purposes. This differential pressure can be applied in one of three ways. Here again, the body element 10 is formed with a central opening 27 in its upper wall. In this instance, an opening need not be provided in the support arm 14. In the first method of applying a differential pressure across the disc, a source of gas under pressure, usually air, is provided by a tube device schematically illustrated at 31. Mounted on the tube is a gasket member 32 adapted to form a fluid-tight seal with the upper face 33 of the body element 10 around the passage 27. Air under pressure is supplied to the tube 31 from any suitable source which should be controlled by a suitable valve. The resetting is accomplished by positioning the gasket 32 against the upper face 33 and pressurizing the disc on the side thereof adjacent to the switch.

Normally, there is sufficient clearance between the bumper 22 and the body element 11 to allow the air under pressure to flow through the switch cavity 12 to the disc cavity 34. However, if necessary, an additional opening can be formed in the body element 11 to provide this fluid communication between the switch chamber 12 and the disc chamber 34. It is recognized that a fluid-tight joint is not normally provided between the disc 18 and the cap 19. However, sufficient resistance to flow is provided to create the necessary pressure differential to cause the disc to move to the reset position illustrated. If necessary, the disc retaining cup 19 is provided with an opening 36 to insure that pressure does not build up on the remote side of the disc sufficiently fast to prevent resetting of the disc. In any event, it is preferable to apply the pressure as a pulse of sufficient magnitude to cause a substantially instantaneous resetting of the disc. After the disc has been reset, the openings 27 and 36 can be closed by applying a settable adhesive.

Also illustrated in FIG. 2 is a vacuum tube 37 which is connected to a suitable source of vacuum through a suitable control valve. Here again, a gasket 38 is provided at the end of the tube 37 to engage and form a seal with the surface 39 of the retainer cup 19. Resetting is accomplished in this embodiment by positioning the gasket against the surface 39 and applying a vacuum to the adjacent side of the disc while atmospheric pressure exists on the opposite side. Here again, the differential pressure in sufficiently great to cause resetting of the disc. Preferably, the disc retaining cup 19 is formed with one or more openings 36 so that the vacuum will be transmitted directly to the adjacent side of the disc.

As a third alternative, the pressure and vacuum methods can be combined by positioning both the tube 31 and the tube 37 in the operative position while supplying a vacuum to the tube 37 and pressure to the tube 31. In this way, greater amounts of differential pressure can be obtained without excessive pressure on the pressure side of the device.

Referring now to FIG. 3, in this embodiment the force for resetting the snap disc is supplied by a magnet illustrated in phantom at 41. Such magnet is positioned beside the disc retaining cup 19 to apply a magnetic force to the disc 18. It is preferable to use an electromagnet for this purpose and also to form the disc retaining cup 19 of a nonmagnetic material, such as aluminum, so that it will not shield the disc from the magnetic field. In practice, with the use of this embodiment, it is not necessary to form the body element 10 or the disc retaining cup 19 with openings for access of a reset tool or for fluid communication, as in the embodiments of FIGS. 1 and 2, respectively.

In FIG. 4, the embodiment is illustrated in which the devices 51 are positioned in an insulated cabinet 52 and subjected to a temperature which will produce sufficient thermal forces in the snap disc to cause the snap disc to reset. Normally, thermal fuses are arranged so that the disc operates at an elevated temperature. In such instances, the cabinet 52 is maintained at a low temperature below the reset temperature of the disc. Of course, the disc used in this embodiment must be of the type which has a reset temperature as well as an operating temperature.

Figure 5:
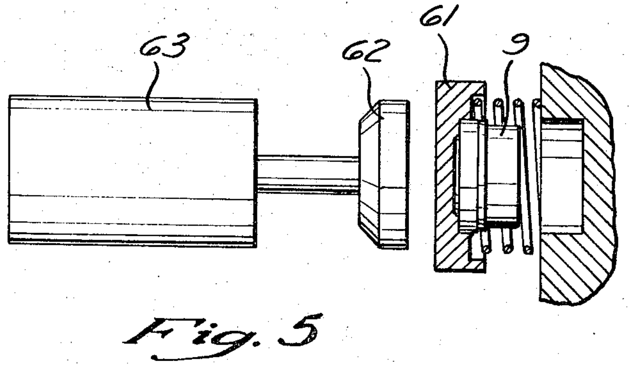
FIG. 5 is a schematic illustration of a system for resetting a thermal fuse in which inertia forces are employed to cause the snap disc to reset.

FIG. 5 schematically illustrates still another method of resetting a snap disc of a thermal fuse in accordance with the present invention. In this embodiment, the device 9 is positioned in a holding fixture 61 and is subjected to a rapid acceleration toward the right, as viewed in FIG. 5, by an impact tool 62. The impact tool may be powered, for example, by a piston and cylinder actuator 63. In this embodiment, the inertia of the disc resists the acceleration and produces an internal stress in the disc material tending to cause the disc to reset.

Because the embodiments of FIGS. 3, 4, and 5 do not depend upon the application of a force directly to the disc, it is possible to use these embodiments on a device in which no physical access to the disc area is provided. In each of the embodiments of this invention, a method of resetting the disc is provided which is not readily available to the user of the device, so resetting of the device is not possible by the user, even though full testing is achieved during manufacture.

Although preferred embodiments of this invention are illustrated, it should be understood that various modifications and rearrangements of parts may be resorted to without departing from the scope of the invention disclosed and claimed herein.

What is claimed is:

1. A method of testing a nonautomatic bimetal snap disc operated thermal fuse device or the like in which said disc moves from a reset position to an operated position in response to an operating condition comprising subjecting said device to its operating conditions and causing said disc to move to its operated position while determining if the operation thereof is within the required limits, and thereafter resetting said disc by applying sufficient force to the disc thereof to move said disc back to its reset position, said force being applied to said disc at least in part by means which do not constitute a part of the complete device and which are not readily available when the device is installed in a system.

2. A method as set forth in claim 1 wherein said device is provided with access means proportioned to receive a reset tool which is not a part of the complete device, and said disc is reset by a mechanical force supplied by such tool through said access means, said tool being removed from said device after resetting said disc.

3. A method as set forth in claim 2 wherein said access means are closed after said disc is reset.

4. A method as set forth in claim 1 wherein said device is provided with a switch operated by said disc, and the position of said switch is electrically sensed to determine if the operation of said disc is within said required limits.

5. A method as set forth is claim 4 wherein the resetting of said disc is determined by electrically sensing the operation of said switch.

6. A method as set forth in claim 1 wherein said disc is reset by applying a pressure differential across said disc with the lower pressure on the side of said disc toward which it snaps during resetting.

7. A method as set forth in claim 6 wherein passage means are provided in said device to facilitate the application of said pressure differential to said disc.

8. A method as set forth in claim 7 wherein said passage means are closed after said disc is reset.

9. A method as set forth in claim 6 wherein said pressure differential is applied by supplying gas under pressure to one side of said disc while the other side thereof is exposed to atmospheric pressure.

10. A method as set forth in claim 6 wherein said pressure differential is applied by supplying a vacuum to one side of said disc while the other side is exposed to atmospheric pressure.

11. A method as set forth in claim 6 wherein said pressure differential is applied by supplying a vacuum to one side of said disc while supplying a pressure to the other side of said disc.

12. A method as set forth in claim 1 wherein said force is applied to said disc by positioning a magnet adjacent to one side thereof.

13. A method as set forth in claim 12 wherein said disc is positioned within a retaining cup formed of a nonmagnetic material.

14. A method as set forth in claim 1 wherein said disc is calibrated with a reset temperature which is not encountered when said device is installed in a system, and said disc is reset by subjecting said device to said reset temperature.

15. A method as set forth in claim 1 wherein said disc is calibrated with a reset temperature substantially below the lowest temperature expected to be encountered when said device is installed in a system, and said disc is reset by subjecting said device to a temperature below the reset temperature of said disc.

16. A method as set forth in claim 1 wherein said device and the disc thereof is subjected to an acceleration sufficient to cause a reset force in said disc.

* * * * *